June 11, 1968      H. EBERTZ      3,387,530
MIRROR REFLEX VIEWFINDER WITH ROOF EDGE PRISM
Filed Nov. 1, 1962      2 Sheets-Sheet 1
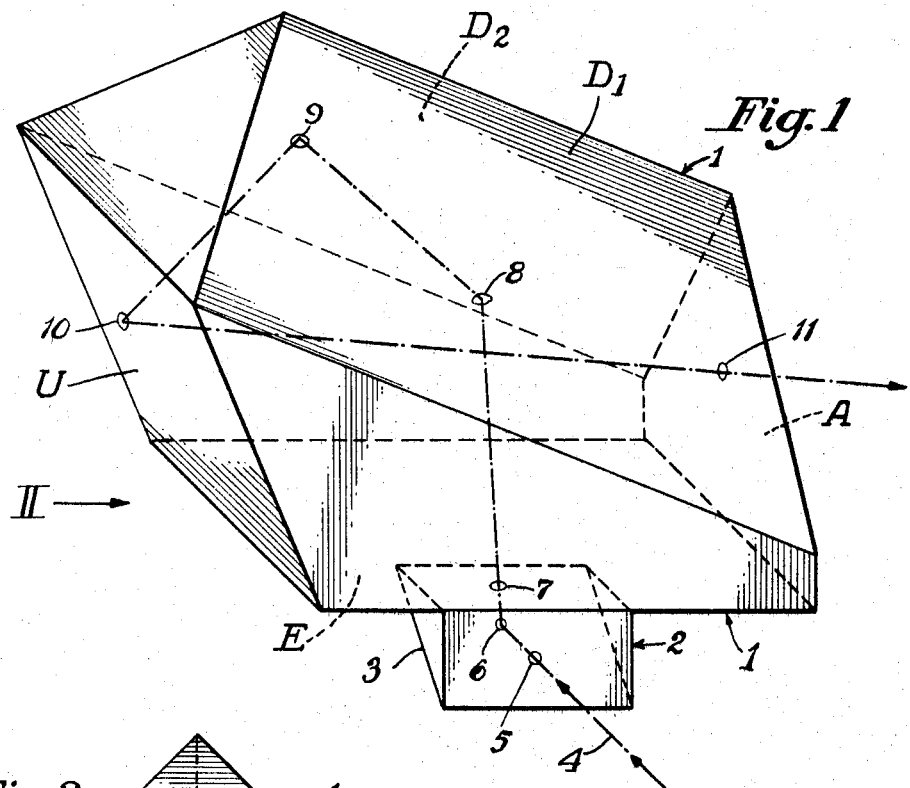
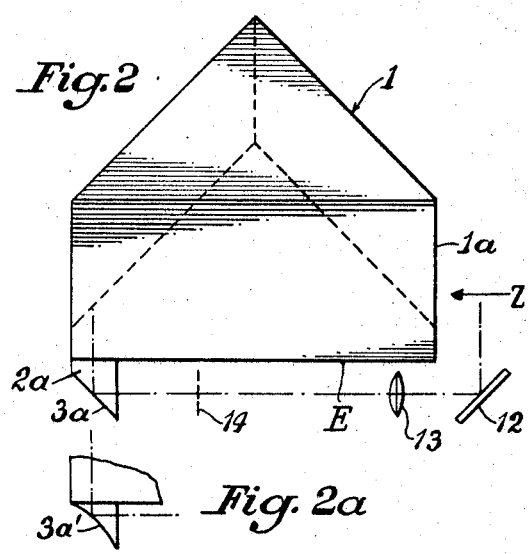
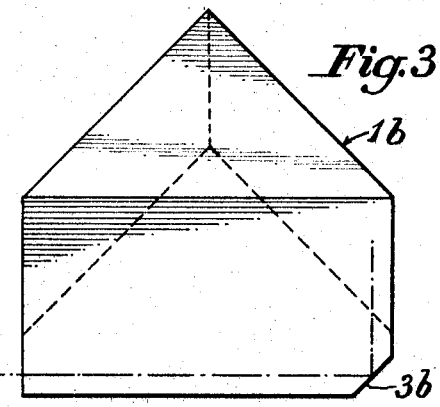
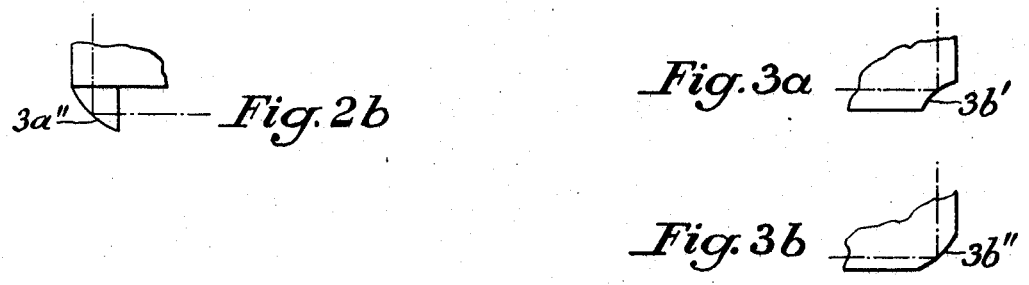

June 11, 1968 H. EBERTZ 3,387,530
MIRROR REFLEX VIEWFINDER WITH ROOF EDGE PRISM
Filed Nov. 1, 1962 2 Sheets-Sheet 2

United States Patent Office 3,387,530
Patented June 11, 1968

3,387,530
MIRROR REFLEX VIEWFINDER WITH
ROOF EDGE PRISM
Helmut Ebertz, Stuttgart-Moehringen, Germany, assignor to Zeiss Ikon Aktiengesellschaft, Stuttgart, Germany
Filed Nov. 1, 1962, Ser. No. 234,601
Claims priority, application Germany, Nov. 11, 1961,
Z 9,063
5 Claims. (Cl. 88—1.5)

The invention relates to a mirror reflex viewfinder with a roof edge prism which additionally is used for projecting adjusting marks arranged outside of the path of the viewfinder rays into the image of the viewfinder. These adjusting marks may consist, for instance, of the movable indicating hand of an exposure meter. This additional projection has been accomplished heretofore by the two roof surfaces and the reflecting surface of the prism used for causing the finder image to stand upright. Since the marks to be projected into the finder image, as the indicating hand of an exposure meter, should appear substantially just as sharp as the focusing plane of the finder image, the indicating hand itself or a real image of the same has to be arranged in front of the viewing eye at the same distance as the focusing plane.

It is an important object of the invention to accomplish this additional projection of an adjusting mark into the viewfinder by means of an additional plane or curved reflecting surface which is arranged outside of the finder focusing plane and projects the image of the adjusting mark into the range of the prism entrance surface, whereby this reflecting surface is inclined with respect to the prism entrance surface in such a manner that a portion of the projected rays will be directed at least approximately parallel to the prism entrance surface.

By arranging at least part of the projection light beam parallel to the prism entrance surface, a space is utilized which is available anyway when employing a roof edge prism. As known, a field lens for illuminating the viewfinder adjusting plane is more or less spaced apart from the prism entrance surface which in most cases is formed by the bottom surface of the prism. The distance of the field lens from the roof edge prism is mostly so great that there is enough space available for an additional projection light beam as far as it is directed parallel to the prism entrance surface. Also the arrangement of the additional reflecting surfaces at the marginal portions of the prism entrance surface, preferably in close neighborhood of the marginal rays and at one of the narrow sides of the rectangular viewfinder, as it is done in accordance with the present invention, makes favorable use of this space which is created by the combined employment of a roof edge prism and a field lens since due to the curvature of the field lens its distance from the prism entrance surface increases in the marginal portions.

The additional surface required for the projection of indicating marks, etc. may be arranged on a prismatic body which is cemented to the entrance surface of the roof edge prism.

In case the field lens has to be arranged so close to the prism entrance surface that no room is left for the desired additional projection light beam or the mounting of the additional reflecting surfaces, respectively, particularly when for the projection of the indicating hand of the exposure meter the entire width of the prism entrance surface is used, then the additional projection light beam has to be directed parallel to the prism entrance surface but within the prism. For this purpose there is space available between the inclined roof surfaces and the entrance surface of the prism. The inclined plane or curved reflecting surfaces may then be ground on one edge at the prism entrance surface or on a plane which is located inside the prism and is directed parallel to the prism entrance surface. When using this plane for the arrangement of the additional reflecting surfaces, the length of the optical path required for an interim reproduction of the marks to be projected may be varied without having to change the dimensions of the camera.

In place of a curved picture field lens it is also possible to use a Fresnel lens. In that case the projection light beam will mostly be directed inside the prism.

It is another object of the invention to indicate in the viewfinder image in addition to the exposure value, which is indicated by an exposure meter, also other adjustment values, as for instance the diaphragm aperture or the exposure time (shutter speed). For this purpose there are arranged at different places of the roof edge prism entrance surface a number of reflecting plane or curved surfaces which are differently inclined to this entrance surface in such a manner that for instance the indicating hand of the exposure meter is projected from one side border surface while from the other side border surface the diaphragm aperture or time scale may be projected, whereby the projection light rays in the range of the prism entrance surface are directed approximately parallel to the latter whereas they may form among themselves any angle different from 180°. In this manner it is possible to project a number of scales or pointers without substantially changing the dimensions of the camera body.

The above disclosed objects of the invention are applicable to all types of prisms which have a roof edge for the purpose of reversing the sides of the finder image, i.e. particularly penta roof edge prisms.

With these and other objects in view the invention will now be described with reference to the accompanying drawings which illustrate several embodiments of the invention.

In the drawings:

FIG. 1 is a perspective view of a conventional viewfinder roof edge prism having attached to its bottom face a small reflecting prism which is used for reflecting an additional light beam into the viewfinder image, such as an image of the indicator hand of an exposure meter;

FIG. 2 is a view of the viewfinder roof edge prism of FIG. 1 when viewed in the direction of the arrow II but with a different arrangement of the additional small prism;

FIG. 2a shows a different shape of the small prism as it may be used in FIG. 2;

FIG. 2b shows still another shape of the small prism as it may be used in FIG. 2;

FIG. 3 illustrates a view of a roof edge prism similar to FIG. 2, but with an additional reflecting face ground on one edge of the base of the prism;

FIG. 3a shows that the additional reflecting face on the prism of FIG. 3 may be concave;

FIG. 3b shows that the additional reflecting face on the prism of FIG. 3 may be convex;

Figure 5:
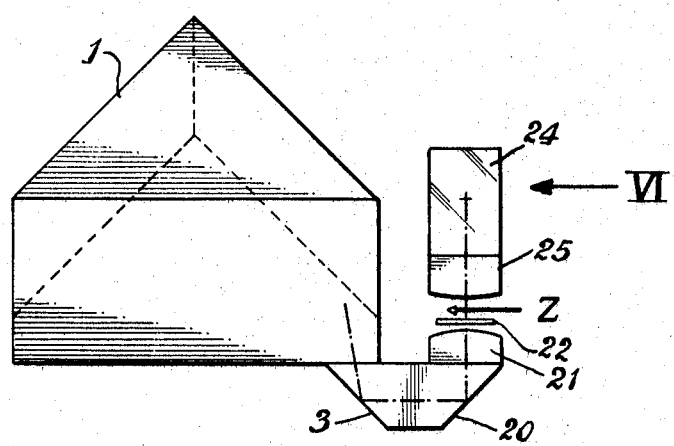
Figure 6:
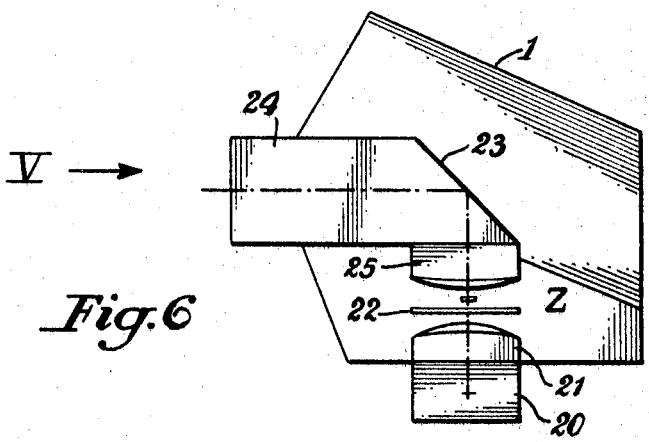

FIG. 5 shows a viewfinder roof edge prism combined with another prism arrangement for reflecting an indicating mark into the viewfinder image in a manner as to assure that both the viewfinder image and the indicating mark have the same brightness; this FIG. 5 is a view in the direction of the arrow V in FIG. 6, and FIG. 6 is a view of the arrangement shown in FIG. 5 viewed in the direction of the arrow VI.

Referring to the drawings, FIG. 1 illustrates in a perspective view a roof edge prism of conventional construction. The finder light beam enters the bottom face E and is reflected by the roof surfaces $D_1$ and $D_2$ toward the surface U which in turn reflects the beam toward the exit surface A. In accordance with the invention, a prism 2 is cemented to the prism entrance face E and is provided with a reflecting surface 3. The indicating hand of the exposure meter is projected by a light beam 4 toward the prism 2 and enters the prism 2 at the point 5 and then is reflected by the point 6 of the reflecting surface 3 upwardly and leaves the prism 2 at the point 7. The light beam is then reflected by the point 8 in the roof surface $D_1$ toward the roof surface $D_2$ and is reflected by the point 9 toward the reflecting surface U. At the point 10 of the surface U the light beam is reflected toward the surface A and leaves this surface in the point 11.

FIG. 2 illustrates the roof edge prism when viewing in the direction of the arrow II in FIG. 1. In this embodiment the prism $2a$, which corresponds to the prism 2 of FIG. 1, is arranged on the opposite side of the prism entrance surface E and the reflecting surface $3a$ of the prism $2a$ is rotated about an angle of 90° compared with the position of the reflecting surface 3 on the prism 2. The indicating hand Z of the measuring instrument of the exposure meter is movable along a side edge $1a$ of the prism 1. The light beam which projects an image of this indicating hand Z is reflected by a plane mirror 12 and a projection lens 13 which in the same manner as the prism 2 is arranged between the prism entrance surface E and a non-illuminated field lens, so that an image of the indicating hand Z will appear in the plane 14 indicated in dash lines. From here the image of the indicating hand is projected onto the mirror surface $3a$ of the prism $2a$ and is reflected into the roof edge prism. Since the plane 14 is arranged in a conjugated position to the focusing plane, the indicating hand Z and its movement forms a sharp image in the finder plane. It may also be advisable to make the reflecting surface $3a$ either concave or convex, as shown by way of example at $3a'$ and $3a''$ in the FIGS. $2a$ and $2b$ in order to obtain any desired correction in the position of the plane of the movement of the indicator or its true image.

According to the embodiments of the invention illustrated in the FIGS. 3, $3a$ and $3b$, the required additional reflecting surface $3b$, $3b'$ and $3b''$, respectively, is produced by grinding the same directly on the prim $1b$. It will be noted that the reflecting surface may be plane, concave or convex. In the embodiments shown in the FIGS. 3, $3a$ and $3b$ the projection path for the light rays of the indicator hand lies within the prism proper, namely substantially at a right angle to the finder light beam. This is a solution which is particularly recommended when the finder adjusting plate or the field lens arranged in front of the same will be positioned directly adjacent the prism entrance face. If the field lens is constructed in the form of a Fresnel lens in which case its surface will be substantially flat, the projection light beam may be arranged within the prism since the Fresnel lens can be arranged without any substantial distance away from the prism entrance surface. Instead of grinding the reflecting surface on the prism $1b$, it is also possible to obtain this reflecting surface by a suitable cutting into the base body of the prism between the two inclined roof surfaces and the prism entrance surface in which case the corresponding cutting face is being made reflective. This procedure makes it possible to vary the path of the projected beam without considering the given dimensions of the camera.

Figure 4:
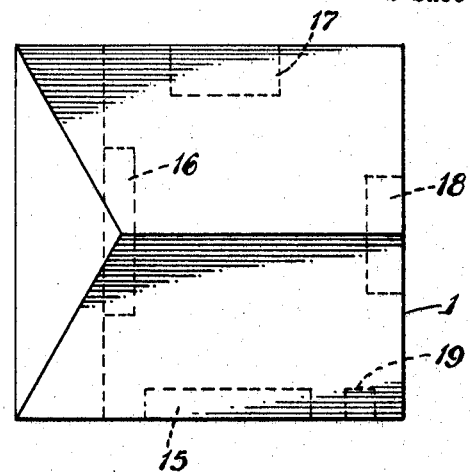
FIG. 4 is a top view of a conventional viewfinder roof edge prism on the bottom face of which are cemented a plurality of small prisms for reflecting different marks into the viewfinder.

FIG. 4 shows that several prisms may be arranged on the prism entrance surface E for the purpose of projecting adjusting marks, for instance different scale ranges into the viewfinder beam. These additional prisms are designated in FIG. 4 with 15, 16, 17, 18 and 19. The prisms 15 and 17 may be arranged with their reflecting face inclined outwardly in the same manner as the prism 2 in FIG. 1, while the reflecting face of the prism 19 may be inclined as illustrated in FIG. 2, so that for instance two scales arranged at opposite sides of the roof edge prism may be projected together with a third scale by means of the additional prism 19 into the viewfinder light path. The position and the inclination of the reflecting prism surfaces 15 to 19 depend upon the arrangement of the scales or their real images, respectively, within the camera. In spite of the multitude of reflections possible in accordance with the present invention, no additional space is required for that portion of the projection ray path which is directed parallel to the prism entrance surface, a fact conducive to a favorable dimensioning of the camera.

The projection of a scale or of a pointer in connection with a scale or a fixed mark into the viewfinder light path has the result that the brightness of the viewfinder image affects the perceptibility of the scale projected into the viewfinder. If, for instance, a poorly illuminated scale is projected into a bright viewfinder image, the observing eye would have to adapt itself to this dim scale before it is able to read the scale. In the same manner there would arise difficulties when observing a bright scale in a darker viewfinder image. It is therefore desirable that the scale to be projected be illuminated from the area of the object so that such differences of brightness may be substantially avoided. In order to be able to combine such an illumination from the area of the object with the projecting means according to the invention, the reflecting surface 3 and the deflecting mirror 20 are united to one prismatic body, as shown in the FIGS. 5 and 6. To the entrance face of this prismatic unit is cemented a field lens 21, in front of which are arranged the scale 22 and the pointer Z. A reflecting layer 23, which casts light from the object area onto the scale, is arranged on a prism 24 on which is cemented an additional field lens 25.

What I claim is:

1. In a mirror reflex viewfinder, the combination with a roof edge prism having a reflecting surface for turning the viewfinder image into an upright position, and an entrance surface arranged opposite of two roof faces, of additional prism means for projecting an indicating mark into the focusing plane of the viewfinder image, said prism means comprising a mirror surface arranged outside of said viewfinder focusing plane but within the range and confines of said prism entrance surface and another surface extending obliquely to said mirror surface in intimate contact with said entrance surface, said mirror surface being inclined with respect to said prism entrance surface so that markings projected parallel to said prism entrance surface will be reflected in a path perpendicular to said entrance surface.

2. A mirror reflex viewfinder according to claim 1, in which said mirror surface is concave.

3. A mirror reflex viewfinder according to claim 1, in which said mirror surface is convex.

4. A mirror reflex viewfinder according to claim 1, in which said mirror surface is arranged on a prism which is cemented to the entrance surface of said roof edge prism.

5. In a mirror reflex viewfinder, the combination with a roof edge prism having a reflecting surface for turning the viewfinder image into an upright position and an entrance surface arranged opposite of two roof faces, of means for projecting a plurality of indicating marks into the focusing plane of the viewfinder image, said means comprising a plurality of additional prism means comprising a mirror surface arranged outside said viewfinder focusing plane but within the range and confines of said prism entrance surface and another surface extending obliquely to said mirror surface in intimate cemented contact with said entrance surface and along the four marginal zones at said prism entrance surface, said mirror surfaces being inclined with respect to said prism entrance surface so that markings projected parallel to said prism entrance surface will be reflected in a path perpendicular to said entrance surface.

References Cited

UNITED STATES PATENTS

| 2,933,991 | 4/1960 | Sauer. |
| 3,017,812 | 1/1962 | Kodalle et al. |
| 3,094,911 | 6/1963 | Reiche et al. |
| 3,128,684 | 4/1964 | Trankner et al. |

FOREIGN PATENTS

| 1,104,323 | 4/1961 | Germany. |
| 1,254,028 | 1/1961 | France. |
| 1,240,877 | 8/1960 | France. |
| 293,144 | 12/1953 | Switzerland. |

JEWELL H. PEDERSEN, *Primary Examiner.*

DAVID H. RUBIN, *Examiner.*

O. B. CHEW, *Assistant Examiner.*